Figure 7:
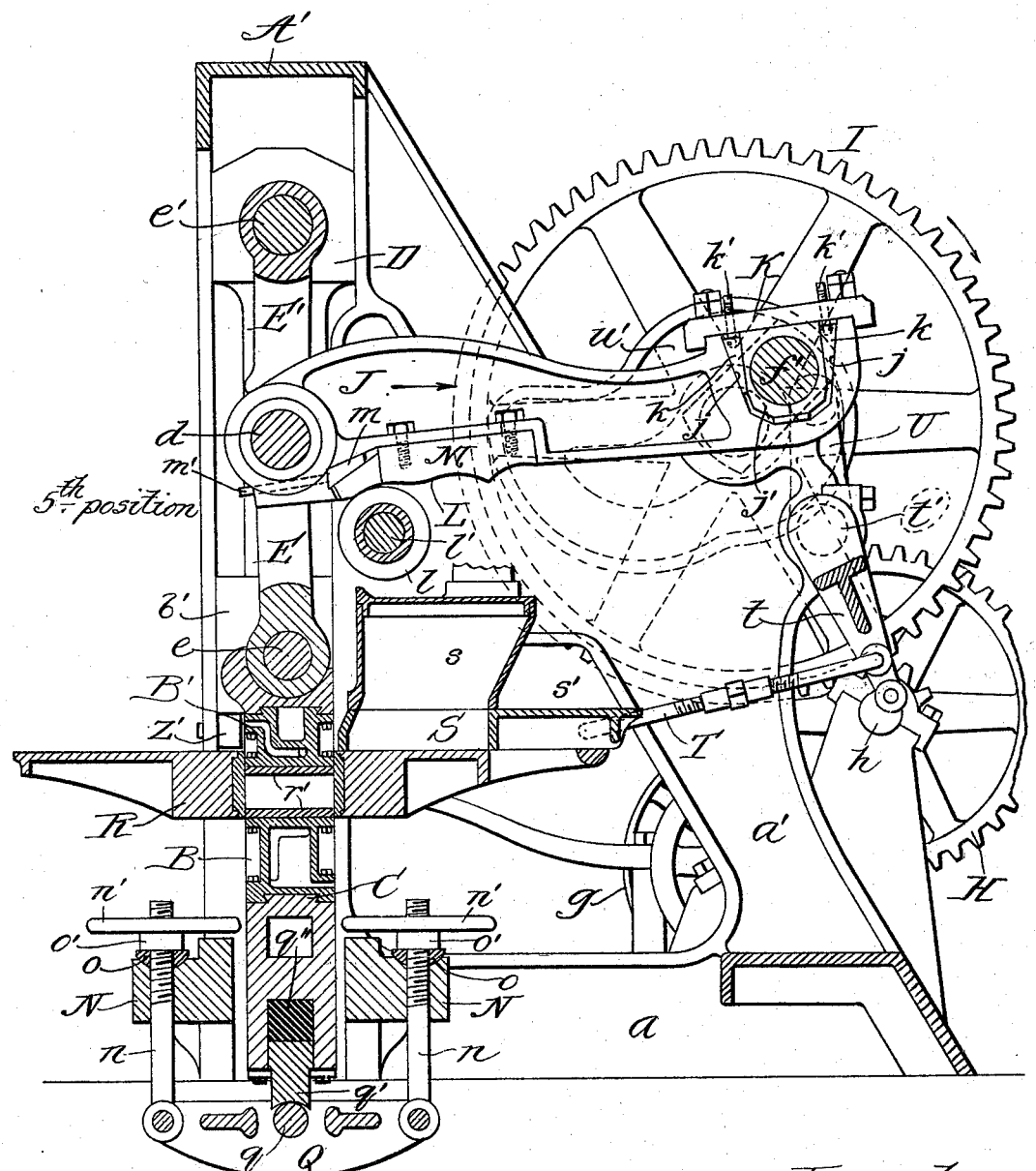

(Model.)
A. BERG.
MACHINE FOR MAKING BRICKS, TILES, &c.
No. 598,554.  Patented Feb. 8, 1898.
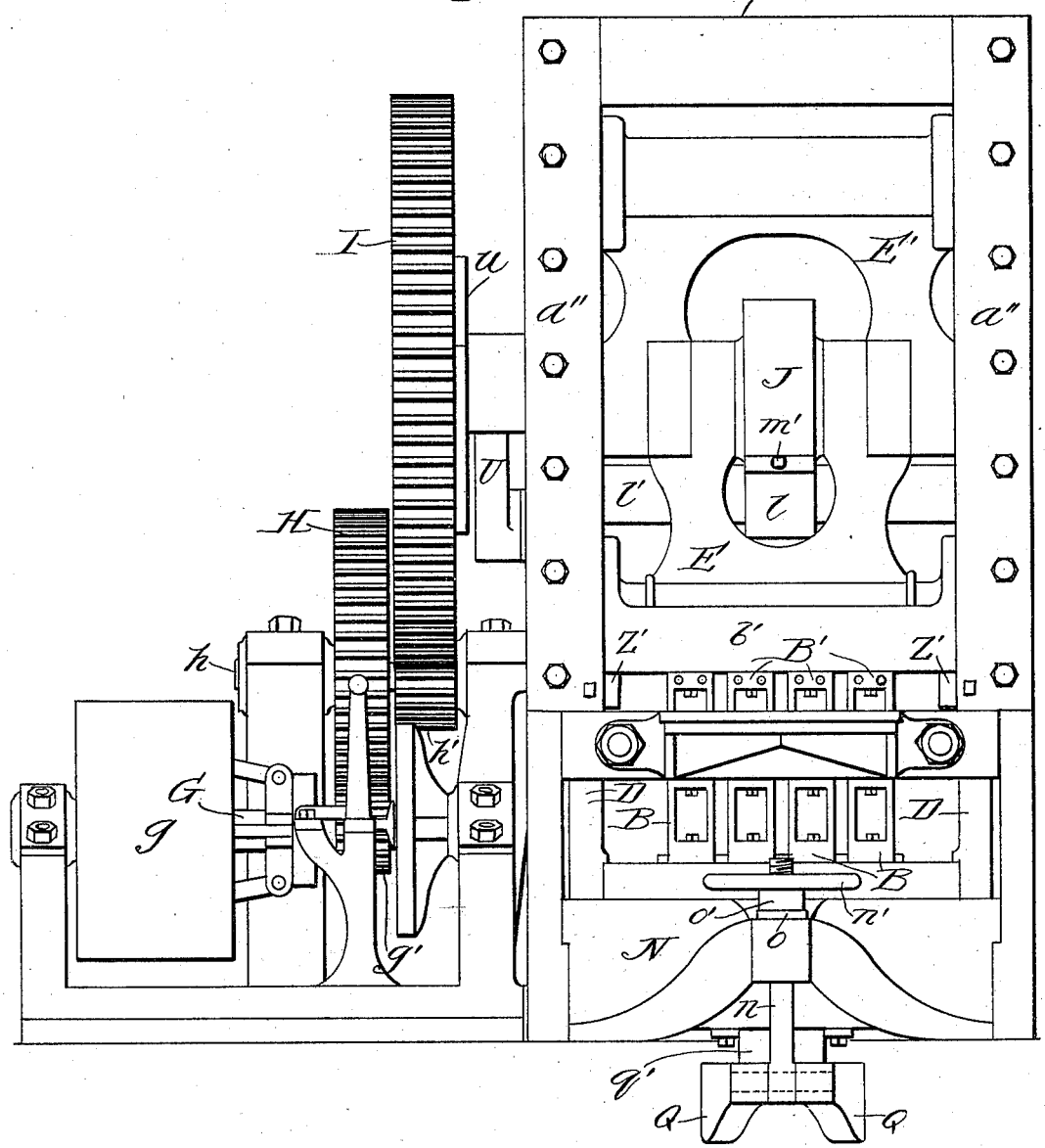

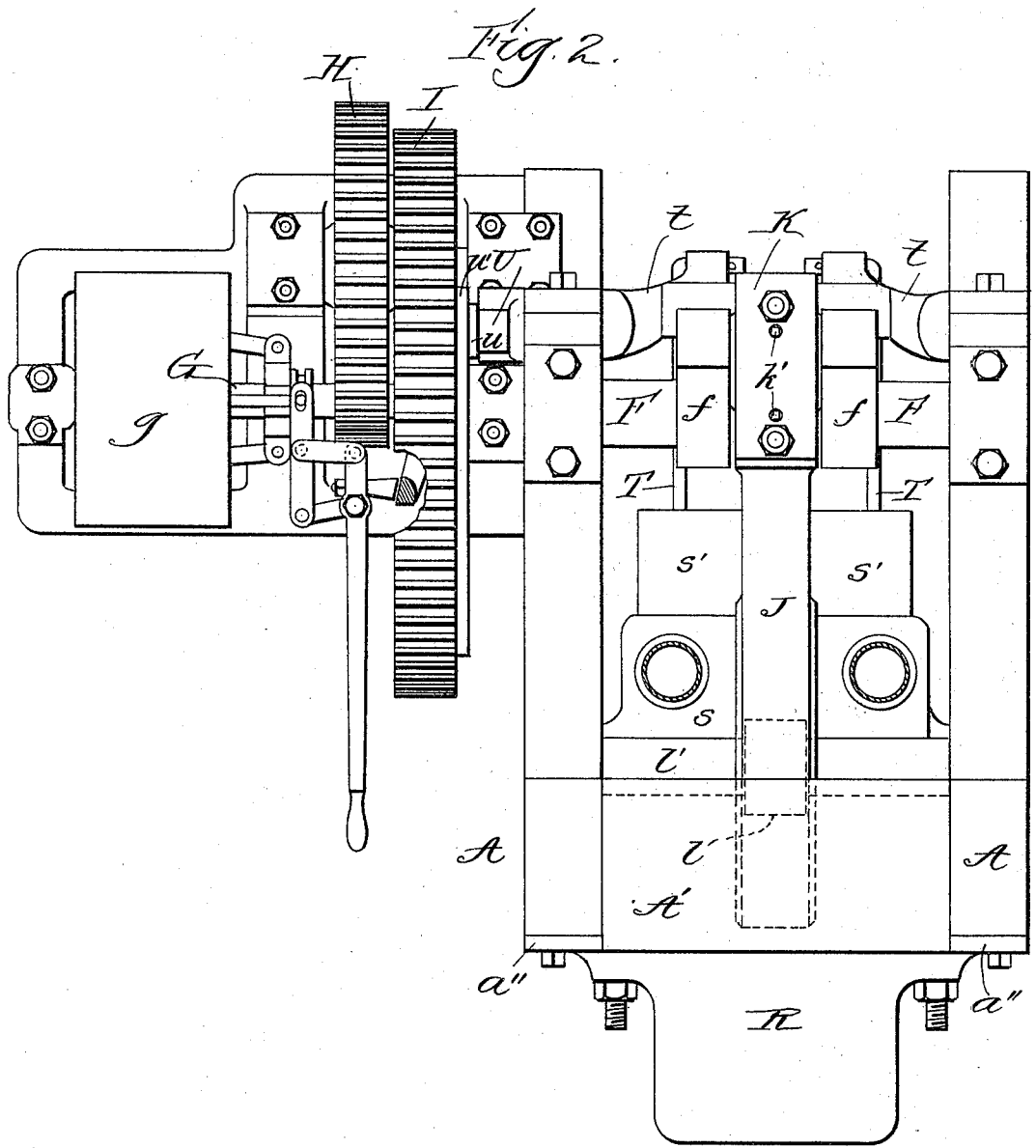

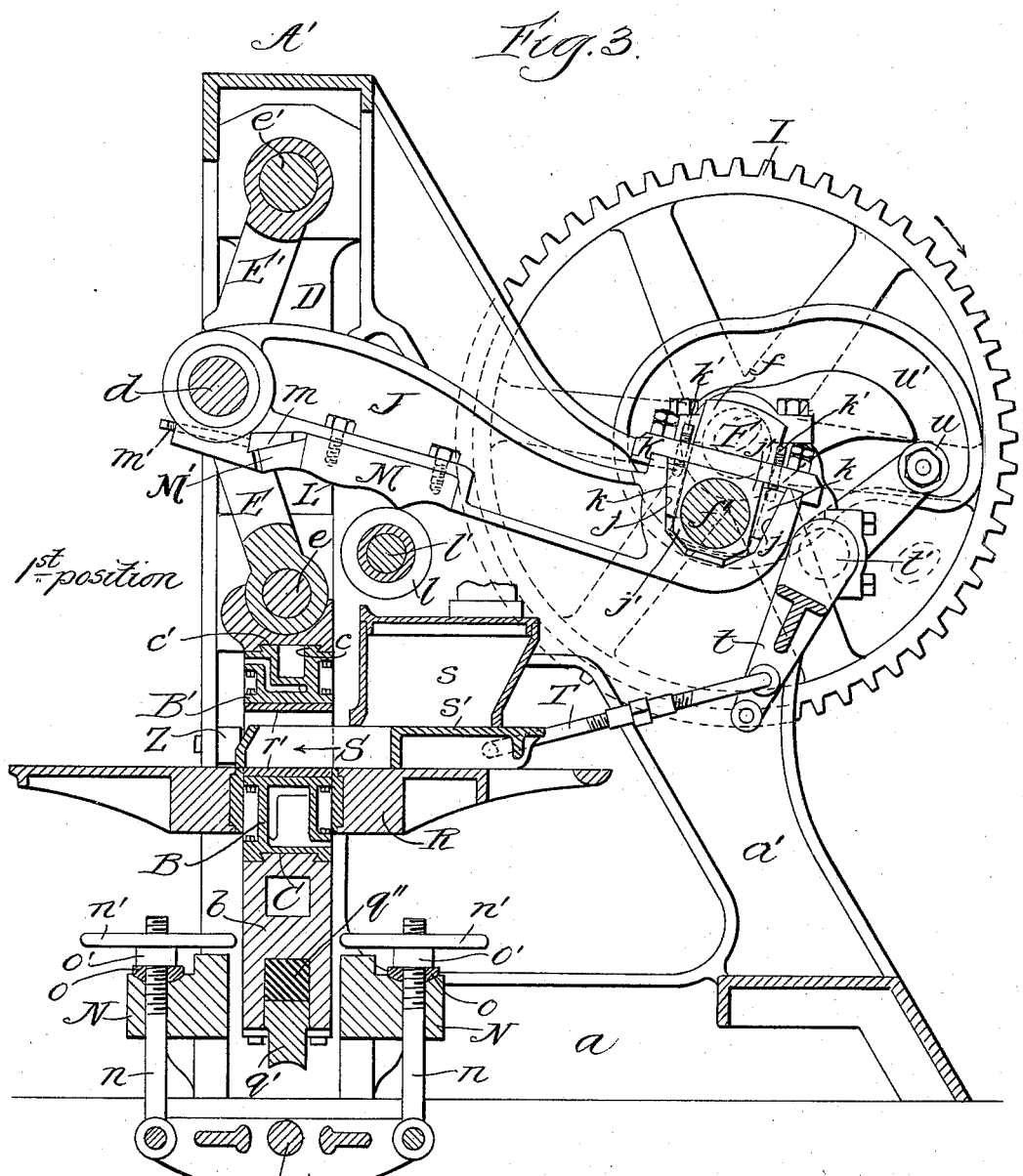

(Model.) 8 Sheets—Sheet 4.
A. BERG.
MACHINE FOR MAKING BRICKS, TILES, &c.
No. 598,554. Patented Feb. 8, 1898.
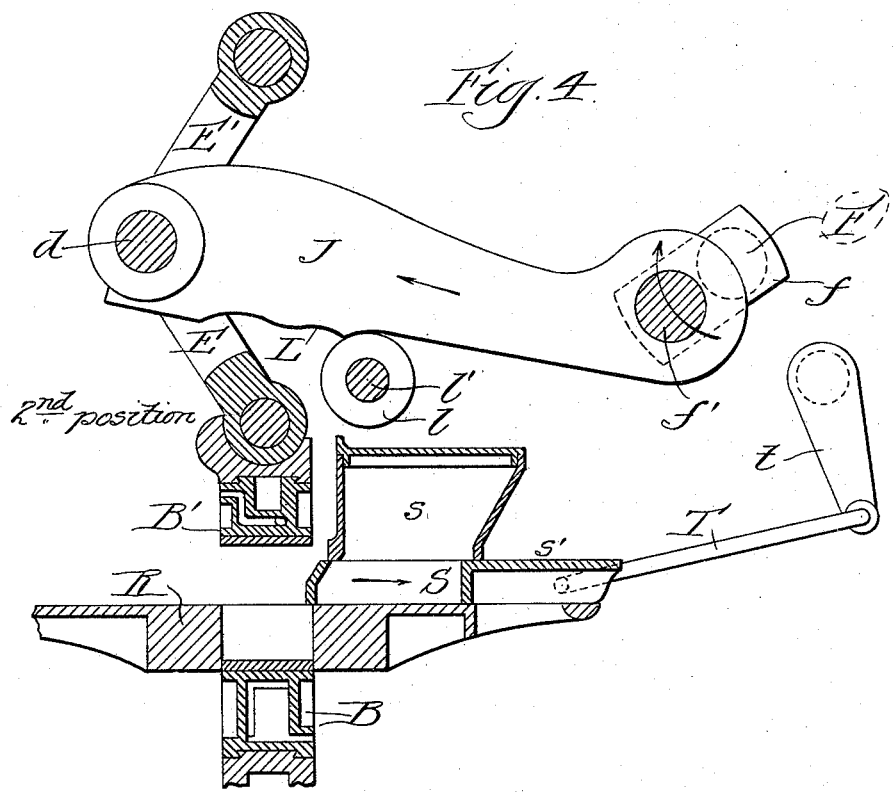
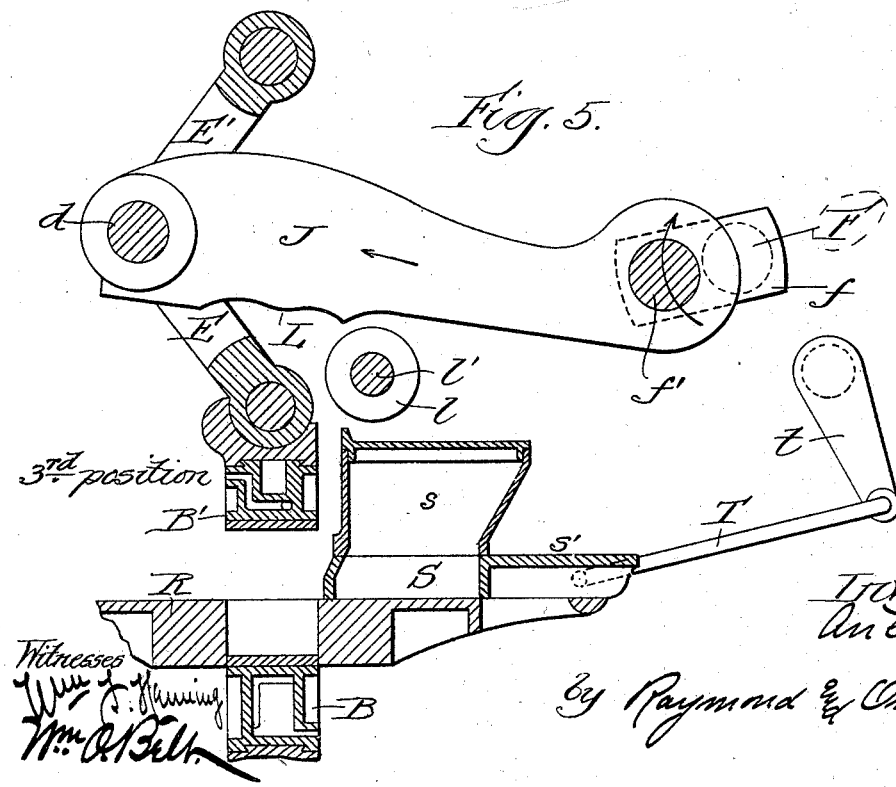
Witnesses
Inventor
Anton Berg
by Raymond & Omohundro
Attys.

(Model.)   A. BERG.   8 Sheets—Sheet 5.
MACHINE FOR MAKING BRICKS, TILES, &c.
No. 598,554.   Patented Feb. 8, 1898.
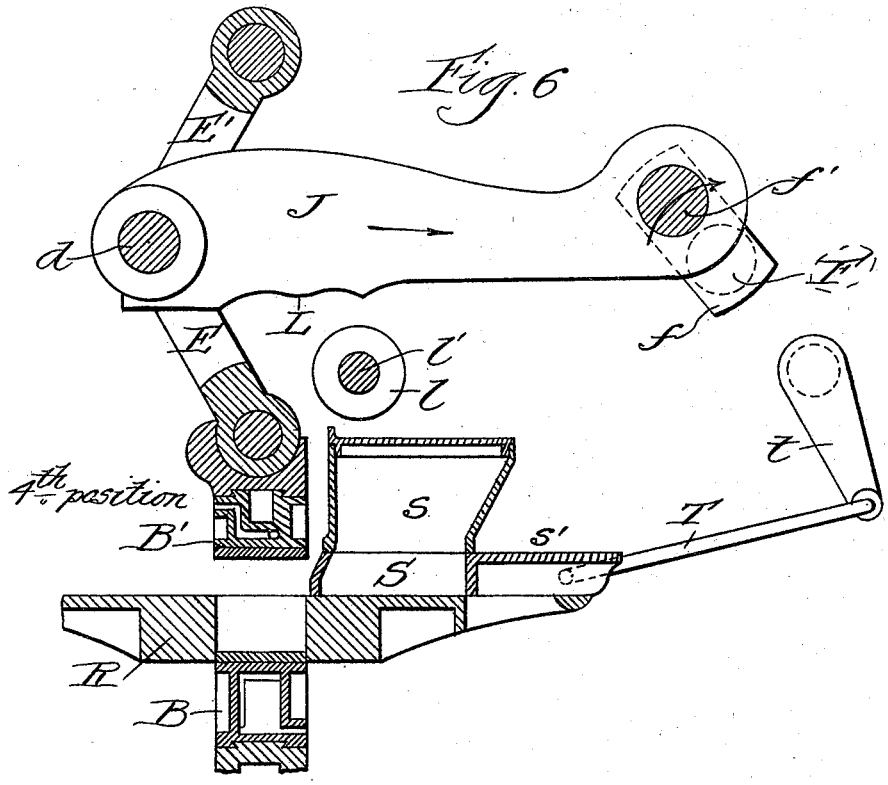
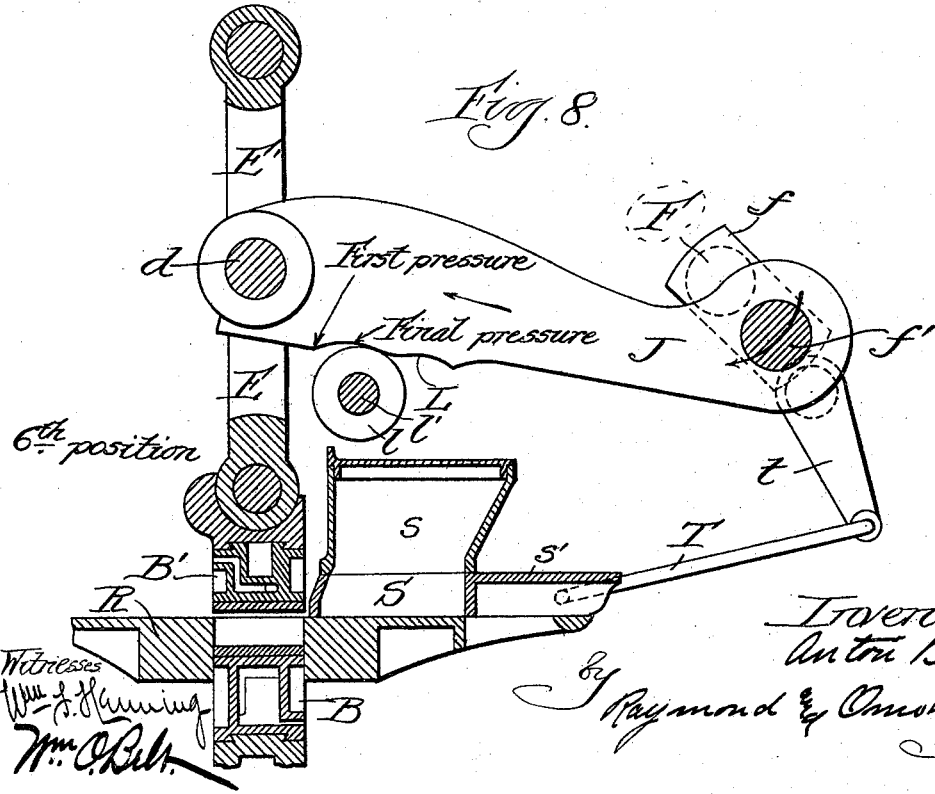

(Model.)  8 Sheets—Sheet 6.

A. BERG.
MACHINE FOR MAKING BRICKS, TILES, &c.

No. 598,554. Patented Feb. 8, 1898.

Witnesses

Inventor
Anton Berg
by Raymond & Onushudo
Attys.

(Model.) 8 Sheets—Sheet 7.
A. BERG.
MACHINE FOR MAKING BRICKS, TILES, &c.
No. 598,554. Patented Feb. 8, 1898.

Witnesses
Wm. F. Henning
Wm. O. Belt.

Inventor
Anton Berg
by Raymond & Onshundro
Attys.

(Model.)
8 Sheets—Sheet 8.
A. BERG.
MACHINE FOR MAKING BRICKS, TILES, &c.
No. 598,554.
Patented Feb. 8, 1898.
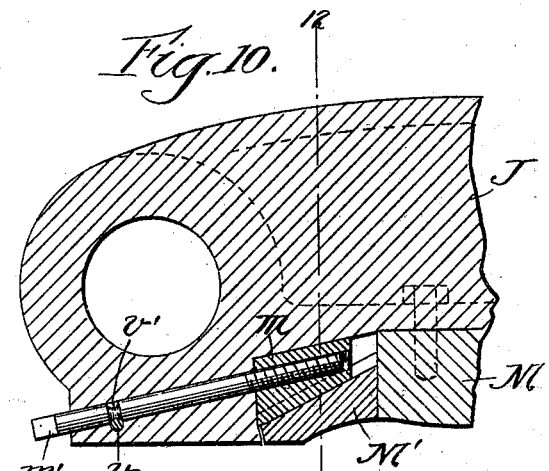
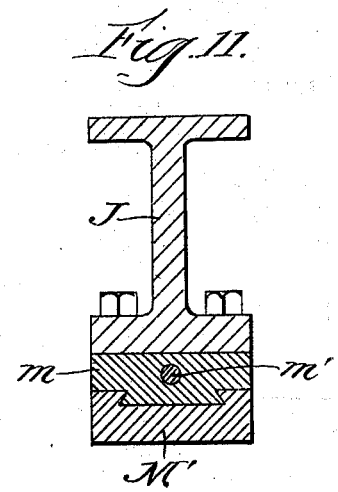
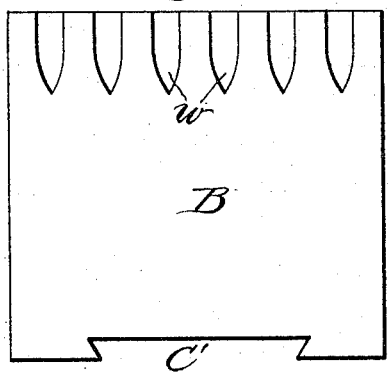
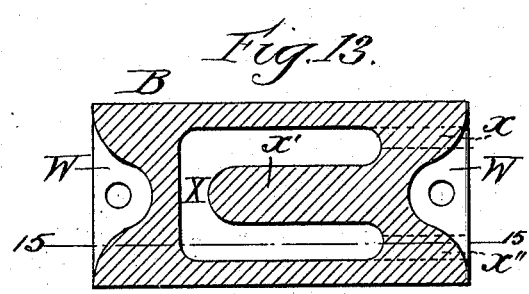
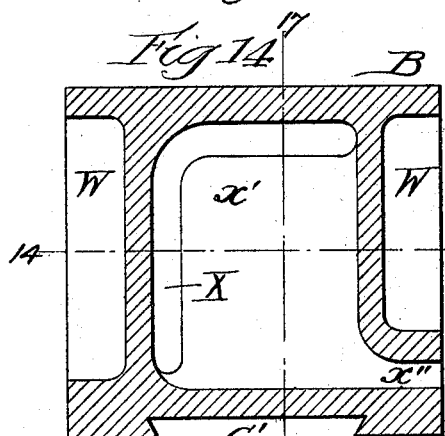
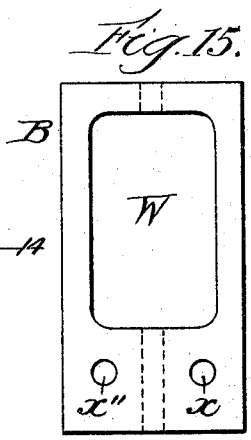
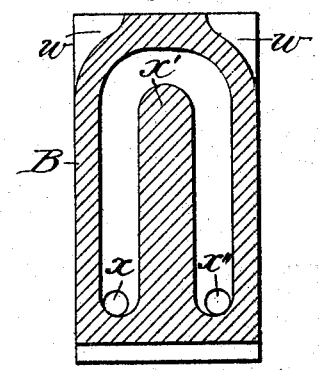
Witnesses
Wm. J. Henning
Wm. O. Belt
Inventor
Anton Berg
By Raymond & Onorhundro
Attys
THE NORRIS PETERS CO., PHOTO-LITHO., WASHINGTON, D. C.

UNITED STATES PATENT OFFICE.

ANTON BERG, OF CHICAGO, ILLINOIS.

MACHINE FOR MAKING BRICKS, TILES, &c.

SPECIFICATION forming part of Letters Patent No. 598,554, dated February 8, 1898.

Application filed July 20, 1896. Serial No. 599,779. (Model.)

*To all whom it may concern:*

Be it known that I, ANTON BERG, a citizen of the United States, residing at Chicago, in the county of Cook and State of Illinois, have invented certain new and useful Improvements in Machines for Making Bricks, Tiles, &c., of which the following is a full, clear, and exact description, reference being had to the accompanying drawings, forming a part of this specification.

My invention comprises certain new and useful improvements in machines for making bricks, tiles, &c., and it relates more particularly to that class of machines in which the clay is pressed between two opposing plungers having differential movements to form the brick, which is then discharged.

In machines of this general character it is desirable to provide for certain adjustments which can be easily and readily changed to enable the machine to operate upon clays of different kinds and to make bricks of the same size and weight or of different sizes and weights, as desired, out of different clays, it being a well-known fact in the art that more of some kinds of clay is necessary to form a standard brick than of others.

My invention therefore has to deal primarily with this feature, which necessarily involves important changes in the general construction of brick-machines.

A primary object of my invention, therefore, is to provide simple and effective means for easily and quickly adjusting the plungers for the purpose of making bricks out of different kinds of clay, which adjustment may be effected without modifying the action of the plungers on the clay, and thereby insuring the formation of bricks in any desired size and of the proper weight and density.

A further object of my invention, also of primary importance, is to provide positive and simple means for producing the proper movement of the plungers to effect the desired compression of the clay, this compression being accomplished during one complete operation of the machine and comprising several different movements of the plungers.

My invention also has for its object to simplify and improve the general and detail construction of machines of this character, to promote their efficiency, to simplify their operation, and to enable them to be constructed and operated inexpensively and with the best results.

With these and other ends in view the invention consists in the peculiar construction, arrangement, and combination of parts hereinafter described, and illustrated in the accompanying drawings, in which—

Figure 9:
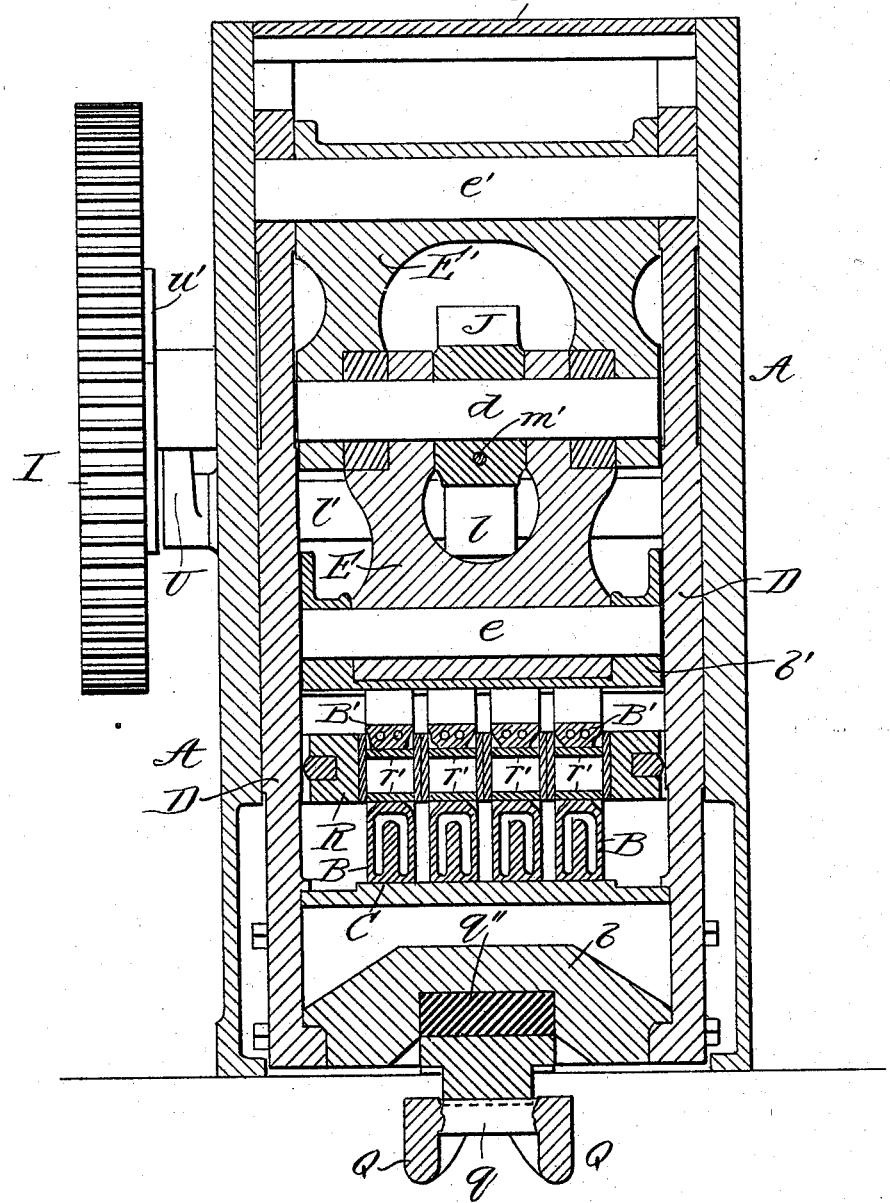

Figure 1 is a front elevation of the machine. Fig. 2 is a top plan view of the machine. Fig. 3 is a side view in section, showing the general construction and arrangement of the operative mechanism of my improved machine and showing the parts in the position which they assume during the first part of the operation when the feed-box has carried a supply of clay onto the lower plunger and the upper plunger is about to descend, its position being designated on the drawings and hereinafter described in this specification as the "first" position. Fig. 4 is a diagrammatic sectional view showing the toggle, the pitman-lever, the plungers, and the feed-box in the second position. Fig. 5 is a similar view showing the same parts in the third position. Fig. 6 is also a similar view showing the same parts in the fourth position. Fig. 7 is a view similar to Fig. 3 and showing the arrangement of the various parts of the machine in the fifth position. Fig. 8 is a diagrammatic sectional view showing the toggle, the pitman-lever, the plungers, and the feed-box in the sixth position. Fig. 9 is a vertical sectional view taken through the side bars, the toggle, the mold, and the other parts in the forward part of the machine. Fig. 10 is a side view in section, similar in its general respects to Figs. 3 and 7 and showing a simple reversal of parts in which the cam-surface which governs the operation of the pitman-lever in part is arranged on the fulcrum instead of on the lever itself. Fig. 11 is a detail enlarged sectional view of the end of the pitman-lever, showing the means for adjusting a part of the cam on said lever laterally. Fig. 12 is a sectional view on the line 12 12 of Fig. 11. Fig. 13 is a side view of the lower plunger. Fig. 14 is a horizontal sectional view of the lower plunger, taken on the line 14 14 of Fig. 15. Fig. 15 is a vertical sectional view of the lower plunger, taken on the line 15 15 of Fig. 14. Fig. 16 is an end view of the lower plunger, and Fig. 17 is a transverse sectional view taken on the line 17 17 of Fig. 15.

Referring to the drawings, in which like letters of reference denote corresponding parts in all the figures, the operating mechanism is supported in a suitable frame comprising the sides A, a top piece A', connecting said sides, a base $a$, and the inclined supports $a'$. The particular construction and arrangement of the frame is not essential and may be varied to comply with different conditions when desired; but I have shown this particular form as one well adapted for the purpose. Face-plates $a''$ are secured on the sides A to constitute guides for the side bars, which operate vertically between the sides of the frame and are maintained in their proper relative position by the face-plates.

The lower plunger B and the upper plunger B' are carried by the lower cross-head $b$ and the upper cross-head $b'$, respectively. The lower cross-head is dovetailed into the lower plunger, being provided with a tenon C, which fits snugly in a mortise C' in the bottom of the plunger, and the upper plunger is dovetailed into the upper cross-head, this plunger being provided with a tenon $c$, which fits snugly into the mortise $c'$ in the cross-head. By this manner of securing the plungers to the cross-heads I am enabled to arrange them quickly in their proper relative positions and in such a manner that they will operate properly, it being of great importance to have the plungers move in a straight vertical line, so that they will enter the mold evenly and properly. These cross-heads are secured to and carried by the vertically-movable side bars D, which operate between the sides A of the frame. The plungers and side bars are operated vertically by means of a toggle which is actuated from a crank-shaft F, suitably connected with said toggle. The lower member E of the toggle is connected to the shaft $e$, journaled in suitable bearings in the upper cross-head $b'$, and the upper member E' of the toggle is connected and carried by a shaft $e'$, journaled in bearings in the upper ends of the side bars. The members of the toggle are pivotally joined together by means of a pin $d$, this pin being the middle pivot-pin of the toggle. The lower member of the toggle is therefore connected to the upper plunger, while the upper member of the toggle is connected to the upper parts of the side bars, whereby the movement of the side bars controls the movement of the upper plunger as well as the movement of the lower plunger; but the movements of these plungers with relation to each other are differential in their practical operation.

The crank-shaft F is journaled in suitable bearings in the inclined supports $a'$ of the frame, and it has the crank-arms $f$, which are connected at their outer ends by the crank-pin $f'$. This crank-shaft is operated from the main shaft G, which carries a belt-pulley $g$ and a pinion $g'$, said pinion meshing with a gear H on the drive-shaft $h$. The drive-shaft $h$ also carries a pinion $h'$, which meshes with the large gear I on the crank-shaft F.

A pitman-lever J is pivotally secured to the middle pivot-pin $d$ of the toggle, and its rear end is pivotally secured to the crank-pin $f'$, connecting the crank-arms of the crank-shaft F. The rear end of this pitman-lever is provided with a socket having inclined side walls $j$, and a box $j'$ is arranged on the crank-pin $f'$ and secured in this socket by means of the plate K, which plate is fastened to the pitman-lever J by means of bolts or other devices. As hereinafter described, it is desirable that the pitman-lever J should have a certain adjustment, and for this purpose and also to make a secure connection between the pitman-lever J and the pin $f'$ I provide wedges $k$, which are arranged between the inclined sides $j$ of the socket and the sides of the box $j'$ and are adjusted and held in place by means of the screws $k'$, which operate through the plate K, whereby these wedges can be adjusted so as to secure the pitman-lever J on the pin $f'$ in its proper position.

When the parts of the machine are readjusted for the purpose of operating on the different kinds of clay or to make a brick of a different size, it may be desirable, as a part of this readjustment, to change in a greater or less degree the distance between the crank-pin $f'$ and the pivot-pin $d$, which can be readily accomplished by moving the wedges $k$ in the proper manner—that is to say, by tightening one wedge and loosening the other to shift the position of the box $j'$ in the socket of the pitman-lever. The effect of this will be to adjust the operation of the pitman-lever in accordance with the operation of the plungers. This is an important feature of my invention, not only because it enables the parts to be adjusted so as to vary the operation of the mechanism as the occasion requires, but also to provide for any possible defects in the construction and arrangement of these and associated parts of the machine which are liable to occur in the course of manufacture.

The pitman-lever J is arranged to operate on an irregular cam-surface, which may be provided on the lever itself, as shown in Fig. 3 and elsewhere in the construction, or it may be located on the fulcrum, as shown in Fig. 10. Referring to Fig. 3, the pitman-lever J is provided with an irregular cam-surface L, which is arranged to operate upon and contact with a fulcrum-roller $l$, mounted on a stationary shaft $l'$, journaled in bearings in the frame of the machine. This cam-surface may be formed directly on the under side of the pitman-lever, if desired, but I prefer to form it on a removable plate M, which is secured in a socket provided for it on the pitman-lever by means of screws or other fastening devices.

As shown in the drawings, the cam-plate is composed of two sections, the main body M of which is bolted or otherwise rigidly but removably secured to the pitman-lever, but without capability of adjustment on the lever, while the section M' is both removably and adjustably secured to the lever, being adjustable vertically or laterally with relation to the pitman-lever by the means and for the purpose described farther on. By making this cam-surface on a removable plate I am enabled to replace the same whenever it becomes worn or should it be desired to employ a cam-surface of a different character. This cam-surface engages the roller $l$, which acts as a fulcrum for the pitman-lever J during a portion of its movement and causes the toggle to operate in the proper manner to actuate the plungers, giving to the pitman-lever and the plungers a differential movement by reason of its irregular surface, which bears upon the fixed fulcrum-roller $l$, thereby producing the formation of a brick by a series of compressions on the clay. In Fig. 3 the upper plunger is almost at its highest position, and while the shaft F rotates and the cam-surface L on the pitman-lever J passes forward over the fulcrum-roller $l$ the lower plunger descends into its lowest position in the mold and receives the supply of clay, the subsequent compression of the clay being accomplished in several successive movements of the plungers, so that a brick or tile of the proper density and hardness throughout will be produced.

The mold is changed according to the character and width or length of the brick desired; but if it is simply desired to vary the thickness of the brick, face-plates $r'$ of greater or less thickness are secured in a suitable manner on the plungers, so that the space between said plungers when they are in the position where they exert the greatest pressure on the clay will be greater or less, as desired. These face-plates may also be changed for different kinds of clay which may be used, so that the lower plunger will drop to such a position in the mold as will permit the proper and predetermined quantity of clay to enter the mold; but in every instance it is desirable that the face-plate on the lower plunger should lie flush with the mold-table during the time that the feed-box is moved over the mold, as shown in Fig. 3, to carry a supply of clay into position on the lower plunger, after which the lower plunger descends into the mold and receives the proper supply of clay for making a brick.

In order to adjust the plungers in the mold in their proper position as required by the thickness of the brick it is desired to make or according to the amount of clay required to make the brick, I provide means for lowering or raising the side bars D to the proper position, which adjustment of the side bars moves the plungers so that they will operate in their proper position. On each side of the lower portion of the sides A, I provide brackets N, and screw-bolts $n$ are arranged through said brackets and are operated by means of the hand-wheels $n'$ on their upper ends. The brackets are provided with conical-shaped seats O to receive the bearings $o$, these bearings being located beneath the collars $o'$ under the hand-wheels $n'$. A cross-piece Q is pivotally supported by these bolts $n$, and it carries at or about its center a stop-pin $q$, upon which a shoe $q'$, secured in a socket in the lower portion of the lower cross-head $b$, is adapted to rest during a part of the operation of the machine, a rubber cushion $q''$ being arranged in the socket and above the shoe $q'$ to prevent any sudden jars to the mechanism.

It is a well-known fact in the art that the quality of clay required for making a brick of standard weight—that is, seven pounds—varies according to the character of the clay used, some clays being lighter than others and therefore requiring more clay to make a brick which shall have the same density throughout. When it is desired to adjust the plungers so that they will operate in the proper manner upon the predetermined quantity of clay, the hand-wheels $n'$ are operated to raise the cross-piece Q and stop-pin $q$ to such a position that when the side bars have descended to their lowest position and the shoe $q'$ is resting on the stop-pin, the lower plunger will be in its lowest position in the mold and supporting the proper amount of clay.

During the operation of the machine the side bars are moved vertically by reason of their connection with the pitman-lever through the toggle, but the stop-pin $q$ limits the downward movement of the side bars and plungers, the shoe $q'$ engaging therewith and causing the lower plunger to assume the proper position in the mold for making the brick.

I have shown in the drawings a mold R, provided with four compartments, a corresponding number of upper and lower plungers being also provided to operate in said compartments, and face-plates $r'$ are secured to the plungers to contact with the clay, these face-plates being removably secured to the plungers, so that they can be easily and quickly arranged in position. The feed-box S operates back and forth across the mold-table and it is supplied with clay from a hopper $s$, which is kept filled in a suitable manner. On the rear portion of the feed-box is an extension $s'$, which closes the lower end of the hopper when the feed-box is projected forward, and to which an adjustable bar T is pivotally secured in a suitable manner. This bar is connected at its other end to a crank $t$, rigidly secured on the rock-shaft $t'$. An arm U is secured rigidly on the rock-shaft $t'$ and it carries a roller $u$, which operates in a cam-groove $u'$ on the gear I.

As the gear I revolves the roller $u$, running in the cam-groove $u'$, actuates the rock-shaft and causes the crank $t$ thereon to reciprocate the feed-box back and forth across the mold-table, this feed-box in its operation carrying forward a supply of clay for one brick and at the same time pushing the completed brick previously made from off of the lower plunger and out of the way of the subsequent operation of the plungers. The rod T may be adjusted to different lengths and it may be connected to the crank-arm $t$ at different points thereon to provide for making bricks or tiles of different lengths when mold-tables having molds of different sizes are arranged in the machine.

In the various adjustments relating to the pitman-lever which may be necessary in connection with the operation of my machine it is obvious that the length of said lever varies with the adjustment, which will cause the plungers to exert their pressure in a different manner and in different parts of the mold. To provide for this, I prefer to make the cam-plate M in sections, one of which sections, M', is adjustable laterally by means of the bolt $m'$, which has a threaded connection with the wedge-block $m$, and is prevented from endwise movement by means of the pin $v$, operating in a groove $v'$, the wedge $m$ having a dovetail connection with the section M' of the cam-plate to hold the same in place. Obviously many other means for adjusting this section may be provided without departing from the spirit of my invention.

The section M' of the cam-plate can be very easily and readily adjusted to conform to the length of the pitman-lever. For example, if the pitman-lever is lengthened by adjustment the cam-section M' is adjusted upward, and if the pitman-lever is shortened by adjustment the cam-section is adjusted downward, these adjustments of the cam-section being readily accomplished by operating the screw-bolt $m'$, which operates the wedge $m$, to control the movement of the cam-section. By means of these adjustments the cam-plate will always present such an operative face as will produce the proper pressure at the desired time and place.

The lower plunger is constructed in a peculiar manner, whereby its operative face will always be maintained at a proper degree of heat and the steam-passages therein always be free from the accumulation of water of condensation. Referring to Figs. 13 to 17, inclusive, the lower plunger B is provided with a steam-passage X, which enters the plunger in one end thereof at $x$ and passes around a partition $x'$, this partition having three sides and its top exposed, so that the steam entering through $x$ may pass around and over the partition, carrying with it all water of condensation to escape through the exits $x''$. This plunger is provided also with recesses W for the purpose of lightness, and the steam-passage therein is arranged in such a way that the steam will keep the plunger heated uniformly throughout and prevent the accumulation of water of condensation, which is apt to freeze when the plunger is not in use and destroy the plunger. Each of the plungers is provided with grooves $w$ around the lower edges to permit the escape of air from between the plungers when they are brought in contact with the clay in the mold.

The operation of my improved apparatus will be generally understood from the foregoing description, and it may be described as follows: The hopper $s$ being supplied with a suitable quantity of clay and the proper mold-table and mold having been arranged in position and the proper adjustments made motion is communicated through the medium of the belt-pulley $g$ to the shaft G and by means of the gearing described to the crank-shaft F and the rock-shaft $t'$. As the crank-shaft F rotates the pitman-lever is moved backward and forward, and during a part of this movement it bears upon the fulcrum-roller $l$, the operation of the pitman-lever and the character of the cam-surface L being such that the toggle and side bars will be operated in the proper manner to secure the desired compression by the plungers. The pitman-lever therefore controls the operation of the side bars, the toggle, and the plungers, and the movement of these parts is caused entirely by the operation of the pitman-lever, which communicates to the side bars the proper vertical movement and also straightens and flexes the toggle at the proper time to secure the desired compression by the movement of the plungers. The rock-shaft causes the feed-box to carry a supply of clay onto the face-plate of the lower plunger B, and the operation of the machine is so timed that the lower plunger will now descend and carry the proper quantity of clay into the mold, after which the plungers will be successively operated to press the clay into the form of a brick, this compression being exerted in the most approved manner, first by one plunger and then by the other. This differential movement of the plungers is caused by the irregular surface L on the pitman-lever J, and the construction of this cam-surface and the operations of the different parts are such that the clay will be compressed to form a brick of even density throughout and of the standard weight. When the brick has been formed, the parts resume the position illustrated in Fig. 3, the forward movement of the feed-box acting to force the completed brick out of position on the lower plunger and onto the table R, after which the same operation is repeated.

The various movements described by the plungers, the toggle, and the pitman-lever during one complete operation of the machine—that is to say, while a single brick is being made—are somewhat involved, and for the purpose of better explaining them I have illustrated in Figs. 3 to 8, inclusive, the principal positions assumed by these parts during this operation. In Fig. 3 the parts are in the position which they assume after the machine is started, which I have designated the "first position," the lower plunger being arranged flush with the mold-table and the feed-box having carried a supply of clay onto said plunger. As the crank on the crank-shaft begins its upward stroke the pitman-lever moves forward, as indicated by the arrow, until the concave on the extreme right of the cam-surface L engages the fulcrum roller, during which movement of the pitman-lever the side bars D drop, so that the lower plunger, with the supply of clay thereon, will be carried to its lowest position in the mold, the feed-box being returned at the same time to its normal position beneath the hopper, as shown in the second position in Fig. 4. As the crank continues to rise the pitman-lever is raised off of the fulcrum-roller, as shown in the third position in Fig. 5, the plungers remaining to all intents and purposes substantially in the same position as shown in Fig. 4. When the crank on the crank-shaft nears its highest position, as shown in the fourth position in Fig. 6, the pitman-lever is on its rearward movement and still out of contact with the fulcrum-roller, the upper plunger at this time beginning its downward stroke, and as the crank-shaft passes its highest position and moves to the fifth position, as shown in Fig. 7, the toggle is brought almost to a dead-center, at which time the upper plunger is exerting its maximum pressure on the clay on the lower plunger. As the crank-shaft continues its movement the pitman-lever moves to the right and brings the toggle to a dead-center and then breaks it on the right of said center. While the toggle is in the fifth position, the upper plunger rests upon the stop block or blocks Z', and as the toggle is straightened, the upper plunger being unable to move downward on account of its engagement with the stop-block, the side bars must move upward, carrying with them the lower plunger, which thus exerts an upward pressure upon the clay and against the upper plunger. When the toggle passes the dead-center, the lower plunger remains substantially in the position it assumes while the toggle is straight, but the upper plunger rises and, as the direction of movement of the pitman-lever is changed and the toggle is again straightened, the upper plunger again presses the clay against the lower plunger, the said lower plunger at that time being slightly raised. During the subsequent movement of the toggle both of the plungers rise, as shown in the sixth position in Fig. 8, but the upper plunger out-travels the lower plunger, so that the distance between the plungers will widen to enable the feed-box to move forward and eject the completed brick and carry a further supply of clay into position on the lower plunger. It will thus be observed that pressure is exerted by each of the plungers upon the clay independently of the other plunger to a certain extent, the upper plunger first compressing the clay on the lower plunger, then the lower plunger rises and presses the clay against the upper plunger, after which the upper plunger gives a final compression of the clay against the lower plunger, and, finally, the two plungers rise together, carrying the brick out of the mold. This method of forming the brick is particularly desirable in order to make a brick of the same density throughout and avoid any soft places in the brick, which are apt to occur from an incomplete or imperfect compression. It is also important in operating on different kinds of clay, for in order to make a brick of standard weight it is necessary to use more of some kinds of clay than of others, but when more is used the compression is such that a brick of the proper size will be formed.

When it is desired to make bricks of a different thickness, face-plates $r'$ of the proper thickness are secured to the plungers, so that when the plungers are in position of maximum compression the distance between the face-plates will be equal to the thickness of the brick.

If a light clay is employed for making bricks or other articles, it will be found necessary to use a proportionately greater quantity thereof to produce a brick of standard weight, and in this case the lower plunger must be allowed to drop in the mold to a greater distance to provide for the increased quantity of clay in the mold. For this purpose the side bars are adjusted vertically by operating the screw-bolts $n$, which in this instance would be turned to lower the cross-piece Q and thereby carry the stop-pin $q$ down into the position where it will constitute a rest for the cross-head $b$ and the side bars when they are in the lowest position. This will permit the lower plunger to operate in a lower position in the mold, and the wedges $m$ and $j$ are adjusted to cause the pitman-lever J to operate in such a manner in this new position, caused by the aforesaid adjustment of the side bars, that the relation of the plungers to each other will not be changed and each will exert the same pressure in the same manner on the clay. The wedges $j$ can be adjusted to throw the pitman-lever forward or backward a limited distance, and the plate M, carrying the cam-surface, can be adjusted, if necessary, by means of a wedge $m$, the bolts which secure said plate to the pitman-lever being arranged in slots in said lever, so that this adjustment can be made. Both plungers, it will be observed, are adjusted simultaneously in a simple and expeditious manner, so that the machine may be adjusted to operate on different kinds of clay without any material loss of time.

Having thus fully described my invention, what I claim, and desire to secure by Letters Patent, is—

1. In a brick-press machine, the combination with a mold and plungers working therein, of side bars carrying the lower plunger, a toggle pivotally secured at one end to the upper ends of the side bars and carrying the upper plunger at its lower end and a pitman-lever adapted to actuate the toggle and the side bars and provided with an irregular-surfaced cam, a fulcrum on the frame of the machine to coact with the cam to communicate to the plungers a differential movement during the pressing operation, substantially as described.

2. In a brick-press machine, the combination with a mold and plungers working therein, of means for operating said plungers comprising the side bars carrying the lower plunger, a toggle pivotally secured to the side bars and carrying the upper plunger, a crank-shaft and means for operating the same, a pitman-lever connected to the crank-shaft and adapted to actuate the toggle and the side bars and provided with an irregular-surfaced cam, and a fulcrum on the frame to coact with the cam to communicate to the plungers a differential movement during the pressing operation, substantially as described.

3. In a brick-press machine, the combination with a mold and plungers working therein, of means for operating said plungers comprising the side bars carrying the lower plunger, a toggle pivotally secured to the side bars and carrying the upper plunger, a crank-shaft and means for operating the same, a fulcrum on the frame, a pitman-lever connected to the crank-shaft and the toggle and adapted to actuate the toggle and the side bars and provided with an irregular-surfaced cam to engage said fulcrum and communicate to the plungers a differential movement during both the pressing and ejecting operation of the machine, substantially as described.

4. In a brick-press machine, the combination with a mold and plungers working therein, of means for operating said plungers comprising the side bars carrying the lower plunger, a toggle pivotally secured to the side bars and carrying the upper plunger, a crank-shaft and means for operating the same, a fulcrum on the frame, and a pitman-lever connected to the crank-pin of said crank-shaft and the middle pivot-pin of the toggle and adapted to actuate the toggle and the side bars and provided with an irregular-surfaced cam operating on said fulcrum during a part of the movement of said pitman-lever to give a differential movement to the plungers during the pressing operation, substantially as described.

5. In a brick-press machine, the combination with a mold and plungers working therein, of means for operating said plungers comprising the side bars carrying the lower plunger, a toggle pivotally secured to the side bars and carrying the upper plunger, a crank-shaft and means for operating the same, a fulcrum-roller on the frame, a pitman-lever pivotally secured to the toggle and said crank-shaft adapted to actuate the toggle and the side bars and provided with an irregular-surfaced cam on its lower side arranged to engage the fulcrum-roller and to give to the plungers a differential movement during the pressing operation, substantially as described.

6. In a brick-press machine, the combination with a mold and plungers working therein, of means for operating said plungers comprising the side bars carrying the lower plunger, a toggle pivotally secured to the side bars and carrying the upper plunger, a crank-shaft and means for operating the same, a fulcrum-roller on the frame, a pitman-lever connected to the middle pivot-pin of the toggle and the crank-pin of said crank-shaft and operating over said fulcrum-roller to actuate the toggle and the side bars and an irregular-surfaced cam carried by said pitman-lever and arranged to engage the fulcrum during a part of its movement to give the plungers a differential movement during the pressing operation, substantially as described.

7. In a brick-press machine, the combination with a mold and plungers working therein, of means for operating said plungers comprising the side bars carrying the lower plunger, a toggle pivotally secured to the side bars and carrying the upper plunger, a crank-shaft and means for operating the same, a stationary fulcrum-roller on the frame, a pitman-lever pivotally secured to the toggle and the crank-shaft, an irregular-surfaced cam on the lower side of said pitman-lever adapted to coact with the fulcrum-roller and communicate to the plungers a differential movement during the pressing operation and means for operating said pitman-lever to actuate the toggle, the side bars and the plungers simultaneously, substantially as described.

8. In a brick-press machine, the combination with a mold and plungers working therein, of side bars, a toggle pivotally secured to the side bars and carrying the upper plunger, a crank-shaft, a fulcrum on the frame, a pitman-lever connected to the toggle and said crank-shaft and provided with an irregular-surfaced cam operating on said fulcrum to communicate to the plungers a differential movement during the pressing operation, and means for adjusting said pitman-lever on the crank-shaft and said cam on the pitman-lever, substantially as and for the purpose described.

9. In a brick-press machine, the combination with a mold, upper and lower plungers working therein, and a toggle connected with and operating one of said plungers, of a fulcrum on the frame, a pitman-lever connected with and operating said toggle, a cam-plate secured to said pitman-lever and having an irregular surface adapted to engage the fulcrum to communicate to the plungers a differential movement during the pressing operation, and a wedge adapted to maintain said cam-plate in its proper position, substantially as and for the purpose described.

10. In a brick-press machine, the combination with a mold, upper and lower plungers working therein and a toggle connected with and operating one of said plungers, of a fulcrum on the frame, a pitman-lever connected with and operating said toggle, an irregular-surfaced cam-plate adjustably secured on the under side of said pitman-lever and adapted to engage the fulcrum to communicate to the plungers a differential movement during the pressing operation, a wedge adapted to be adjusted to secure said cam-plate in its proper position, and a screw-bolt passing through the end of the pitman-lever to operate the wedge, substantially as and for the purpose described.

11. In a brick-press machine, the combination with a mold and plungers working therein, of side bars carrying the lower plunger, a toggle pivotally secured to said side bars and carrying the upper plunger, means for adjusting said side bars vertically to adjust the plungers simultaneously, a fulcrum on the frame, a pitman-lever adapted to operate the toggle and the side bars and provided with an irregular-surfaced cam to engage the fulcrum and give to the plungers a differential movement during the pressing operation, and means for adjusting the pitman-lever, substantially as and for the purpose described.

12. In a brick-press machine, the combination with a mold and plungers working therein, of side bars, a toggle pivoted to said side bars and carrying the upper plunger, a fulcrum on the frame, a crank-shaft and means for operating the same, a pitman-lever pivotally connected to the middle pivot-pin of the toggle and adapted to actuate the toggle, said pitman-lever having a socket in its rear end provided with inclined walls, wedges adapted to be secured between the boxing and the sides of the socket, a cam-plate secured on said pitman-lever and having an irregular surface adapted to engage the fulcrum to communicate to the plungers a differential movement during the pressing operation and means for adjusting said cam-plate, substantially as described.

13. In a brick-press machine, the combination with a mold and plungers working therein, of a pitman-lever adapted to actuate the plungers, a sectional cam carried by said pitman-lever and a fulcrum on the frame of the machine for said lever and coöperating with said sectional cam to communicate to the plungers a differential movement during the pressing operation, substantially as described.

14. In a brick-press machine, the combination with a mold and plungers working therein, of a pitman-lever adapted to actuate the plungers, a sectional cam carried by said pitman-lever, and a fulcrum on the frame for said lever and coöperating with said sectional cam to communicate to the plungers a differential movement during the pressing operation, one part of said cam being laterally adjustable with relation to the other part, substantially as described.

15. In a brick-press machine, the combination with a mold and plungers working therein, of a pitman-lever adapted to actuate the plungers, a fulcrum on the frame for said pitman-lever, a sectional cam carried by the pitman-lever and coöperating with the fulcrum to communicate to the plungers a differential movement during the pressing operation, and means for adjusting one part of said cam with relation to the other part, substantially as described.

16. In a brick-press machine, the combination with a mold and plungers working therein, of a pitman-lever adapted to actuate the plungers, a fulcrum on the frame for said lever, a sectional cam carried by the pitman-lever and coöperating with the fulcrum to communicate to the plungers a differential movement during the pressing operation, a wedge and a screw-bolt connected with the wedge and adapted to be operated to adjust one part of the cam laterally with relation to the other part, substantially as described.

17. In a brick-press machine, the combination with a mold, side bars, a lower plunger carried by the side bars and a toggle pivoted at its upper end to the side bars and carrying the upper plunger at its lower end, of a fulcrum on the frame, and a pitman-lever connected to the middle pivot-pin of the toggle and provided with an irregular-surfaced cam operating over said fulcrum to impart movement to the toggle in different directions during the pressing operation, substantially as described.

18. In a brick-press machine, a plunger having a partition therein and a steam-passage arranged on three sides and the back of said partition, substantially as described.

19. In a brick-press machine, a plunger having a partition and a steam-passage arranged on three sides and the back of said partition, said steam-passage having its entrance and exit in the same end of the plunger and in substantially the same horizontal plane, substantially as described.

ANTON BERG.

Witnesses:
M. E. SHIELDS,
WM. O. BELT.